(12) United States Patent
De Jong

(10) Patent No.: US 12,485,259 B2
(45) Date of Patent: Dec. 2, 2025

(54) DEVICE FOR RECIPROCALLY PUNCTURING SKIN

(71) Applicant: MEDICAL PRECISION B.V., Zwolle (NL)

(72) Inventor: Erik Jan De Jong, Enschede (NL)

(73) Assignee: MEDICAL PRECISION B.V., Zwolle (NL)

( * ) Notice: Subject to any disclaimer, the term of this patent is extended or adjusted under 35 U.S.C. 154(b) by 703 days.

(21) Appl. No.: 17/632,298

(22) PCT Filed: Aug. 10, 2020

(86) PCT No.: PCT/NL2020/050504
§ 371 (c)(1),
(2) Date: Feb. 2, 2022

(87) PCT Pub. No.: WO2021/029767
PCT Pub. Date: Feb. 18, 2021

(65) Prior Publication Data
US 2022/0288373 A1 Sep. 15, 2022

(30) Foreign Application Priority Data

Aug. 9, 2019 (NL) .................................... 2023627
Jan. 14, 2020 (NL) .................................... 2024668

(51) Int. Cl.
*A61M 37/00* (2006.01)
(52) U.S. Cl.
CPC .............................. *A61M 37/0076* (2013.01)
(58) Field of Classification Search
CPC ..................... A01K 11/00–008; A61B 17/3401
See application file for complete search history.

(56) References Cited

U.S. PATENT DOCUMENTS 5,471,102 A 11/1995 Becker et al.
5,628,719 A 5/1997 Hastings
(Continued)

FOREIGN PATENT DOCUMENTS

CN 202236856 5/2012
CN 204502099 7/2015
(Continued)

OTHER PUBLICATIONS

International Search Report and Written Opinion for PCT/NL2020/050504, mailed Nov. 9, 2020 (18 pages).

*Primary Examiner* — Brigid K Byrd
(74) *Attorney, Agent, or Firm* — KDW Firm PLLC

(57) ABSTRACT

A device for puncturing skin in a reciprocal manner includes a reciprocally movable needle, a driving device including a driving mechanism and a driving rod arranged for driving the reciprocally movable needle between a retracted and extended position. The driving mechanism is arranged for reciprocally driving the driving rod in a longitudinal direction along the longitudinal axis of the driving rod. The driving device further includes a suspension system arranged between a frame member of the driving device and the driving rod and the suspension system is arranged for elastically suspending the driving rod in the longitudinal direction in the frame such that the driving rod is freely movable in longitudinal direction. The suspension system is further arranged for biasing the driving rod to a longitudinal neutral position.

14 Claims, 3 Drawing Sheets

(56) References Cited

U.S. PATENT DOCUMENTS

| | | |
|---|---|---|
| 2007/0083223 A1 | 4/2007 | Kluge |
| 2008/0055028 A1 | 3/2008 | Mask et al. |
| 2008/0082023 A1 | 4/2008 | Deck et al. |
| 2012/0209303 A1* | 8/2012 | Frankhouser ....... A61M 5/3287 606/169 |
| 2014/0324089 A1 | 10/2014 | Chan |
| 2015/0057653 A1* | 2/2015 | Sugiyama ............... H02J 50/12 606/34 |
| 2015/0359559 A1* | 12/2015 | Scherkowski ... A61B 17/32093 606/186 |
| 2016/0346519 A1* | 12/2016 | Bagwell ............. A61B 17/3401 |
| 2018/0236178 A1 | 8/2018 | Neumetzler |

FOREIGN PATENT DOCUMENTS

| | | |
|---|---|---|
| CN | 108042905 A | 5/2018 |
| DE | 102014012896 A1 | 3/2016 |
| GB | 1331024 A | 9/1973 |
| JP | 2005161077 A | 6/2005 |
| JP | 2011522673 A | 8/2011 |
| NL | 2024668 B1 | 2/2021 |
| WO | 2009152056 A1 | 12/2009 |
| WO | 2019096936 A1 | 5/2019 |
| WO | 2019112430 A1 | 6/2019 |
| WO | 2021029767 A1 | 2/2021 |

* cited by examiner

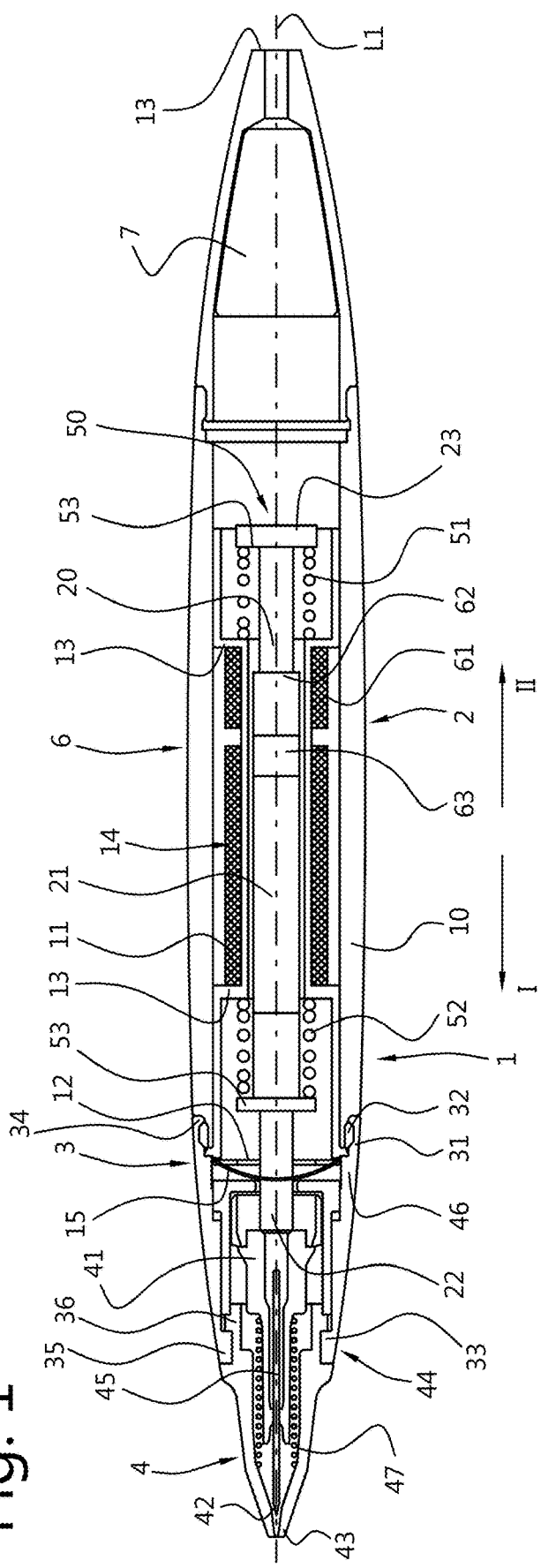
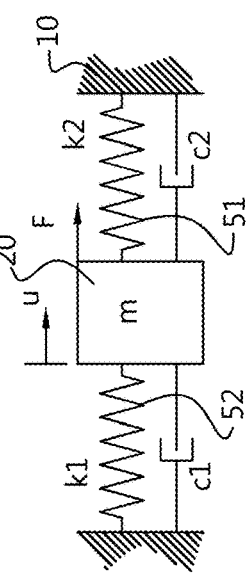
Fig. 1
Fig. 2

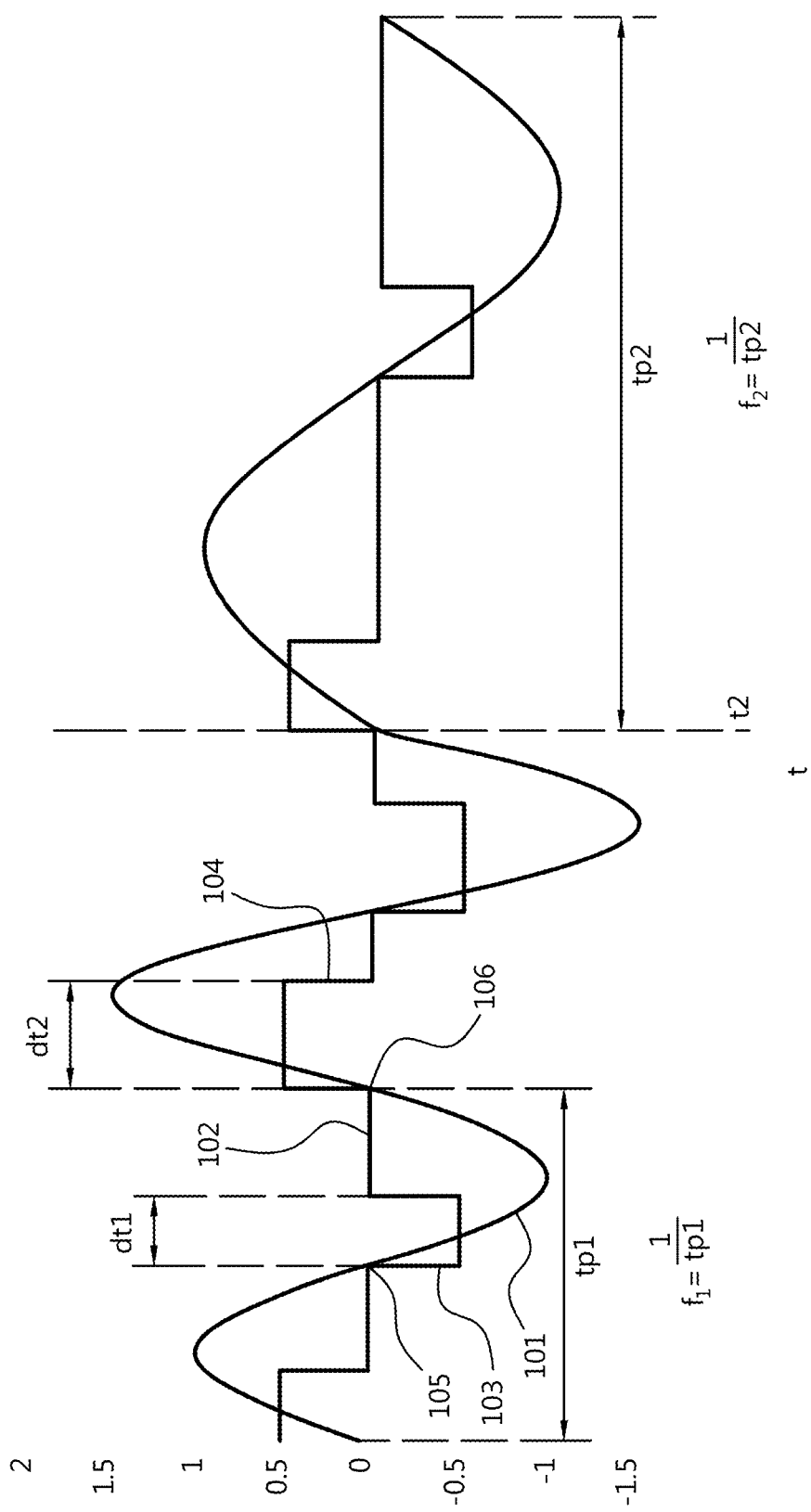

DEVICE FOR RECIPROCALLY PUNCTURING SKIN

This application is a national stage filing under 35 U.S.C. 371 of pending International Application No. PCT/NL2020/050504, filed Aug. 10, 2020, which claims priority to Netherlands patent application serial number 2023627, filed Aug. 9, 2019, and also claims priority to Netherlands patent application serial number 2023668, filed Jan. 14, 2020, the entirety of which applications are incorporated by reference herein.

The present invention relates to a device for reciprocally puncturing skin.

In radiation therapy, or simply radiotherapy, a patient is typically locally subjected to a radiation beam to control or kill malignant cells. It is important that these beams are directed as accurately as possible onto the target to on the one hand ensure optimal therapy of these malignant cells and to on the other hand minimize damage to surrounding tissue upon exposure to the radiation beam.

To properly direct the radiation beams to the tissue as pre-operatively planned, it is known to apply small skin marks on the patient which can be used to automatically direct and align the beams as planned, for instance based on CT-scans of the patient. As radiation therapy typically involves subjecting the target to radiation beams repeatedly over time, sometimes several months, these marks need to remain during the course of therapy to ensure continued proper alignment. It is therefore known to introduce ink into the skin of the patient as skin mark.

Typically, for applying these marks, a small knife or scalpel is used. This knife is dipped in ink and subsequently introduced into the patient's skin. This can be a painful process, in particular in regions on the patient with superficial bone structures such as the thorax. Further, dipping the ink takes time and may result in accidental drips of ink, while at the same time accidental punctures due to the exposed knife are a risk.

Device for introducing ink in skin, for instance tattooing devices for puncturing skin in a reciprocal motion are as such known from the field of tattooing or permanent makeup. Permanent marks are typically however not preferred by patients. Clearly, the use of a tattooing device for applying these radiation therapy marks would lead to undesired permanent marks.

It is a goal of the present invention, next to other goals, to provide an improved and/or more efficient driving device for a device for puncturing skin wherein at least one of the above mentioned problems is at least partially alleviated.

This goal, amongst goals, is achieved by a driving device for a device for puncturing skin in a reciprocal manner comprising a reciprocally movable needle, wherein the driving device comprises:
  a driving mechanism or means and a driving rod that is arranged for driving the reciprocally movable needle between a retracted and extended position;
  wherein the driving mechanism are arranged for reciprocally driving the driving rod in a longitudinal direction along the longitudinal axis of the driving rod;
  wherein the driving device further comprises a suspension system arranged in between a frame member of the driving device and the driving rod and, wherein the suspension system is arranged for elastically suspending the driving rod in the longitudinal direction in the frame, such that the driving rod is movable in longitudinal direction and wherein the suspension system is further arranged for biasing the driving rod to a longitudinal neutral position.

Preferably, the extended position is set such that, when driving the reciprocally movable needle, the needle and therewith any ink, is only introduced in the epidermis of the patient's skin. Other than for instance in the field of tattooing, where the ink is introduced in the tissue underlying the epidermis, this will result in a non-permanent mark. It was however found that the superficial marks as applied using the needle module of the current invention remain sufficiently long to allow continued proper alignment during the course of radiotherapy.

The thickness of the layers of skin may vary between patients. Preferably, said extended position is such that a needle penetration depth is 1.5 mm or less, even more preferably 1.2 mm or less, even more preferably 1.0 mm or less. The lower limit is defined such that the ink is introduced sufficiently deep in the skin and may for instance be 0.1 mm, preferably 0.2 mm. A preferred working range is between approximately 0.2 mm and approximately 0.8 mm.

As the suspension system elastically suspends the driving rod in the longitudinal direction in such a manner that, if the elastic force of the elastic suspension is overcome, the driving rod is still allowed to move in the longitudinal direction, i.e. the driving rod is not fixedly constrained in the longitudinal direction. Such a construction enables one to find a frequency range of driving the driving rod wherein the driving rod can be efficiently driven, i.e. requiring less power than when driven at a less beneficial frequency range, be driven. For instance, the device can be very efficiently driven around a resonance frequency (or Eigenfrequency) of the suspended driving rod.

It is further preferred if the suspension system is arranged such that the driving rod has a predefined resonance frequency in the longitudinal direction and wherein the driving mechanism are arranged for reciprocally driving the driving rod in a driving frequency, wherein the driving frequency is based on the resonance frequency. By arranging the suspension system such that the suspended driving rod has a predefined resonance frequency, the driving frequency range in which the reciprocating needle can be driven by the driving rod is known a priori. Hereby, one obtains a reliable and energy efficient manner of driving the reciprocating needle. As less power is required for reciprocally driving the driving rod and needle at, and/or around, the resonance frequency, this means that less power is to be supplied, consumed and converted by the driving mechanism for driving the driving rod, whereby the driving mechanism can be made smaller and cheaper. In addition, as less energy is consumed, also less heat is generated, which would otherwise need to be disposed of in order to prevent overheating of the device. These benefits can be achieved in particular by driving the device with a driving frequency in a range of 70% to 130% of the resonance frequency, preferably in a range of 80% to 120% of the resonance frequency, more preferably in a range of 90% to 110% of the resonance frequency, most preferably in a range of 95% to 105% of the resonance frequency.

In a preferred embodiment, the suspension system comprises two elastic elements that are arranged in between the driving rod and the frame member, and, preferably, wherein the first elastic element is arranged for biasing the driving rod in a first longitudinal direction with respect to the frame member and wherein the second elastic element is arranged for biasing the driving rod in a second longitudinal direction with respect to the frame member, wherein the second longitudinal is opposite to the first longitudinal direction. In other words, the two elastic elements are arranged to generate opposing elastic forces with respect to each other. Elastic elements will, when elastically deformed, generate an elastic force in reaction to the deformation. These types of elements are therefore highly suited for biasing the driving rod to the longitudinal neutral position, while at the same time allowing the driving rod to be displaceable in the longitudinal direction.

It is further preferred that each elastic element is arranged to contact the frame member on a first end of the elastic element and the driving rod on a second end of the elastic element, such that, when in rest, the driving rod is biased to a neutral position, wherein the neutral position is located on, or in between, the retracted and extended positions. Preferably, in this neutral position the needle is not exposed from a housing. Hereby, the elastic elements can be arranged substantially parallel and at a distance with respect to each other. By locating the elastic elements near the ends of the driving rod, a compact construction of the suspension system is obtained. Also, the arrangement of the suspension system is such that the driving rod and elastic elements are arranged along the longitudinal direction of movement, such that the suspension system can be constructed in a relatively simple manner.

Preferably, the elastic elements are arranged such that, upon movement of the driving rod in a first longitudinal direction from the neutral position, an increased deformation of at least the first elastic element is caused and that, upon movement of the driving rod in a second longitudinal direction from the neutral position, whereby the second longitudinal direction is opposite from the first longitudinal direction, an increased deformation of at least the second elastic element is caused. Hereby, the driving rod is biased towards the neutral position. Suitable elastic elements are, for instance, compression springs, tension springs, coil-springs (compression and/or tension), made from metals such as (spring-) steel, suitable natural and/or synthetic rubber-like materials and/or other suitable synthetic and/or natural materials. Other types of suitable elastic elements are for instance also gas-springs In a preferred embodiment, the driving device further comprising a controller, wherein the controller is arranged to control an amplitude of longitudinal displacement of the driving rod with respect to the neutral position and wherein the controller is, preferably, arranged for controlling the amplitude of longitudinal displacement by controlling a driving force generated by the driving mechanism and/or by means of controlling the driving frequency. The controller is able to control the driving mechanism of the driving device, thereby enabling that the amplitude of the longitudinal displacement of the driving rod, which is reciprocally driven, can be set and controlled. Hereby, the needle is driven by the driving rod between a retracted and extended position (which positions are based on the amplitude of the longitudinal motion), whereby the extended position is set such that it is prevented that the needle disposes ink in the tissue underlying the epidermis, which would then result in permanent markings, which is undesired.

Furthermore, if the driving frequency of the driving mechanism can be varied, as described above, this would then also results in a change of the ratio between the driving frequency and the predefined resonance frequency. Due to this change in the ratio of frequencies, also in case of a fixed amplitude of the excitation force (i.e. the driving force), the amplitude of the reciprocal motion of the driving rod will also change. If the difference between the driving frequency and the resonance frequency becomes less, the amplitude of motion will increase, if the difference becomes larger, the amplitude of motion will decrease. Hence, the amplitude of motion of the driving rod can be controlled by the controller through a change in the driving frequency, the driving force and/or a combination of both. By controlling the driving force, the amplitude of motion can simply be adapted by varying the force generated by the driving mechanism.

In a preferred embodiment, the controller is arranged to control the amplitude of longitudinal displacement and/or the driving frequency by providing the driving mechanism with a pulse-wise driving signal, wherein a period of the pulse-wise driving signal is based on the resonance period of the driving rod, wherein the resonance period is the reciprocal of the resonance frequency. Such a pulse-wise driving signal, which is also referred to as a pulse train, can be a repetitive series of pulses, separated in time. The pulse-wise driving signal can be a sustainably periodic pulse-wise driving signal having, preferably substantially fixed and substantially constant, time intervals. By providing a periodic pulse-wise driving signal that is based resonance period, the driving mechanism imposes a broad-band excitation on the driving rod, which has the natural tendency to have an amplified response in its resonance frequency. Thereby, one can efficiently excite the driving rod in its resonance frequency without the need to exactly match the control signal (in terms of frequency) to the resonance frequency of the driving rod. Preferably, the (substantially periodic) pulse-wise driving signal comprises of alternating positive and negative pulses, as this allows to excite the driving rod twice per period.

Also, as the resonance frequency is, for instance, influenced by the mass of the reciprocally moving needle, and/or the impendence of the skin of a patient, the resonance frequency can vary during use. Hence, as the control of the driving mechanism allows for a slight mismatch between the resonance period and the period of the (substantially periodic) pulse-wise driving signal, this simplifies control while obtaining a very energy efficient driving mechanism.

In a further preferred embodiment, the controller is arranged for controlling the amplitude of motion, and thereby the extended position of the respective needle, by varying the pulse-width of the respective pulses of the (substantially periodic) pulse-wise driving signal. As varying the pulse width allows to control the amount of energy that is provided to the driving mechanism and thereby the amplitude of motion of the driving rod.

These benefits can be achieved in particular by a (substantially periodic) pulse-wise driving signal having a period in a range of 70% to 130% of the period of the driving rod, preferably in a range of 80% to 120% of period of the driving rod, more preferably in a range of 90% to 110% of the period of the driving rod, even more preferably in a range of 95% to 105% of the period of the driving rod. It is then further preferred that the driving device further comprises a measurement unit, wherein the measurement unit is arranged to measure a state variable, such as a displacement, velocity and/or acceleration of the driving rod along the longitudinal direction and/or the driving force in the longitudinal direction of the driving mechanism, and wherein the controller is arranged to control, based on the measured state variable, the amplitude of longitudinal displacement. Hereby, a closed loop feedback system is obtained based on the actual measured state variables, wherein the amplitude of displacement of the reciprocating motion of the driving rod, and thereby the retracted and extended position of the needle, can be accurately controlled by the controller, such that an accurate and energy-efficient device for puncturing skin in a reciprocal manner is obtained.

In a further preferred embodiment, the controller is arranged to determine a displacement zero-crossing of the driving rod, preferably from the measured state variable, and to provide the driving mechanism with a pulse of the (substantially periodic) pulse-wise driving signal at the time of the displacement zero-crossing. A displacement zero-crossing occurs when the driving rod passes the longitudinal neutral position. At the longitudinal neutral position the measured displacement of the driving rod is zero with respect to the position of the driving rod when the driving device is at rest. Alternatively and/or additionally, the displacement zero-crossings can be determined by measuring a maximum positive and/or negative velocity of the driving rod in a cycle. Preferably, the controller is arranged for generating the (substantially periodic) pulse-wise driving signal in dependence of the measured displacement zero-crossing, such that the controller automatically changes the period of a (substantially periodic) pulse-wise driving signal upon detection of a change of the resonance period of the driving rod. Hereby, a highly energy efficient and adaptable driving device is obtained. In combination with, for instance, the variation of the pulse width, as described before, the amplitude of displacement of the needle can be controlled very accurately.

In a preferred embodiment of the device, the driving mechanism or means comprises an electromagnetic coil that is arranged to one of the frame member and the driving rod and wherein a magnetic (or ferromagnetic) portion is arranged on the other of the frame member and the driving rod, and wherein one of the electromagnetic coil and the magnetic portion, at least partially, surround the other of the electromagnetic coil and magnetic portion. The electromagnetic coil is arranged to allow an electric current to pass the coil, whereby an electromagnetic field is generated. As the one of the electromagnetic coil and the magnetic portion, at least partially, surround the other of the electromagnetic coil and magnetic portion, the electromagnetic field generated either attracts or repulses the magnetic portion. The attractive or repulsive force thereby accelerates the driving rod along the longitudinal direction. The reciprocal motion is obtained by passing an alternating and/or dynamically controlled electric current with the driving frequency through the coils, thereby generating a alternating electromagnetic field with a frequency equal to the driving frequency. The amplitude of reciprocal longitudinal motion of the driving rod, and thereby the motion of the movable needle, can thereby be controlled by varying either the frequency of the alternating current through the coil, and/or by varying the amplitude of the alternating current, whereby the strength of the field and thereby the driving force is varied.

Preferably, the driving mechanism comprise a plurality of electromagnetic coils, wherein, preferably, the controller is arranged for controlling and/or switching at least two of said electromagnetic coils with a different current and/or voltage for generating a respective plurality of magnetic fields. Hereby, the motion of the driving rod can be controlled more precisely, such that the possibility of an overshoot of the movable needle past the extended position, which could lead to permanent markings, is reduced. Also, the plurality of the electromagnetic coils increases the driving force that the driving mechanism can deliver, while also improving the efficiency of the device. It is further preferred that the plurality of electromagnetic coils are arranged on one of the frame member and the driving rod and are arranged parallel along the longitudinal axis of the driving rod, and wherein at least a part of the magnetic portion extends along the longitudinal axis between at least two electromagnetic coils in the extended and retracted position. Hereby, the at least two electromagnetic coils can cooperate to force the driving rod to move according to the required motion. This is for instance achieved by generating a set of cooperative attractive and repulsive forces that act on the driving rod. It is further noted that the driving mechanism or means can further comprise a plurality of the magnetic portions that are arranged to cooperate with the plurality of electromagnetic coils to further optimize driving the driving rod.

In a preferred embodiment of the device, the measurement unit comprises a secondary magnetic portion that is arranged in, or on, one of the frame member and the driving rod, and wherein the measurement unit further comprises a measurement coil that is arranged in, or on, the other of the frame member and the driving rod a longitudinal position that at least partially overlaps with a longitudinal position of the secondary magnetic portion. The relative motion between the secondary magnetic portion and the measurement coil generates changing magnetic fields, which, for instance, induce changing currents in the measurement coil. The motion of the driving rod with respect to the frame can be determined from these changing currents by, for instance, a suitable measurement interpreter or by the controller.

It is further preferred that the secondary magnetic portion and the measurement coil are arranged and at distance from, and/or are insulated from, the magnetic portion(s) and/or the electromagnetic coil(s) of the driving mechanism. Influences and/or disturbances from the electromagnetic fields that originate from the electromagnetic coils of the driving mechanism are hereby minimized. These influences and/or disturbances can lead to measurement errors. It is further noted that a magnetic portion as mentioned throughout the text can be, or comprise, a permanent magnet, a section made from ferromagnetic materials, an electromagnetic coil and/or the like.

In a preferred embodiment, the driving device comprises a guiding mechanism arranged for allowing only movement of the driving rod along the longitudinal direction. Hereby, the driving rod is securely retained in the driving device is all directions other than the longitudinal direction. The risk of a magnetic and/or electric short-circuit from the electrical coils contacting the opposing magnetic portions is hereby also minimized, whereby a reliable driving device can be obtained.

In a preferred embodiment, the predefined resonance frequency of the suspended driving rod is in the range of 30 Hz-250 Hz, preferably in the range of 50 Hz-200 Hz, more preferably in the range of 75 Hz-150 Hz, most preferably around 100 Hz or around 80 Hz. A resonance frequency in this frequency range can be relatively easily obtained, without requiring the use of extra stiff and/or light materials, such that an economically attractive device is obtained. Also, the frequency is sufficient for relatively quickly placing markers that are sufficient for its intended use, such that a long and potentially painful process of placing markers is prevented as much as possible.

A preferred embodiment of the device is obtained if the reciprocally movable needle is comprised in a dismountable needle module, wherein the driving device is arranged to mount the needle module by means of a releasable force- and/or form-locked connection. Sterile needles are needed for each patient and/or other receiver of temporary markings. The use of dismountable needle modules enables that the needle module, comprising the needle, can easily be removed without the use of tools. It is then further preferred that the releasable force- and/or form-locked connection is a bayonet connection comprising a male and a female connector, and wherein the driving device comprises one of the male and female connectors. A bayonet connection is a reliable, practically fail-proof, connection that requires no use of specialized equipment for both locking and unlocking of needle modules to the driving device. Furthermore, a user can easily verify that the bayonet connection is correctly locked, which improves the safety of the device during use.

The goal amongst goals is further achieved by a device for puncturing skin in a reciprocal manner, comprising a reciprocally movable needle and a driving device according to any of the preceding claims. In a preferred embodiment of the device, the reciprocally movable needle is comprised in a needle unit that is arranged in a needle module, wherein the needle unit is arranged to be movable in the longitudinal direction with respect to the needle module. The device can, for instance, be very efficiently driven around a resonance frequency (or Eigenfrequency) of the suspended driving rod. The other advantages of such a device have been described earlier. It is further preferred that, when driving device is at rest, the movable needle is fully retained in the device, such that a needle tip is prevented from accidentally puncturing the skin of individual, such as a user.

It is further preferred that the device comprises a spacer element that is arranged in between the needle module and the driving device for arranging the needle module at a predefined distance from the driving device. Thereby, the distance the needle tip extends from the needle module can be altered, which results in a further reduction of possible unwanted permanent markings.

In a preferred embodiment, the driving device is arranged for releasable mounting of the needle module and/or the spacer element and comprises a first section of a releasable force- and/or form-locked connection, wherein the first section of the releasable force- and/or form-locked connection is arranged for engaging and connecting to a second section of the a releasable force- and/or form-locked connection that is arranged on the spacer element and/or the needle module. Sterile needles are needed for each patient and/or other receiver of temporary markings. The use of dismountable needle modules enables that the needle module, comprising the needle, can easily be removed without the use of tools.

Preferably, the releasable force- and/or form-locked connection is a bayonet connection comprising a male and a female connector, and wherein the driving device comprises one of the male and female connectors and the needle module and/or spacer element comprises the other of the male and female connectors for forming the bayonet connection. As mentioned, a bayonet connection is a reliable, practically fail-proof, connection that requires no use of specialized equipment for both locking and unlocking of needle modules to the driving device. Furthermore, a user can easily verify that the bayonet connection is correctly locked, which improves the safety of the device during use.

The present invention is further illustrated by the following figures, which show a preferred embodiment of the device according to the invention, and are not intended to limit the scope of the invention in any way, wherein:

FIG. 1 schematically shows a cross-sectional view of an embodiment of the device for reciprocally puncturing skin.

FIG. 2 schematically shows an equivalent dynamic model of the suspended driving rod.

Figure 3A:
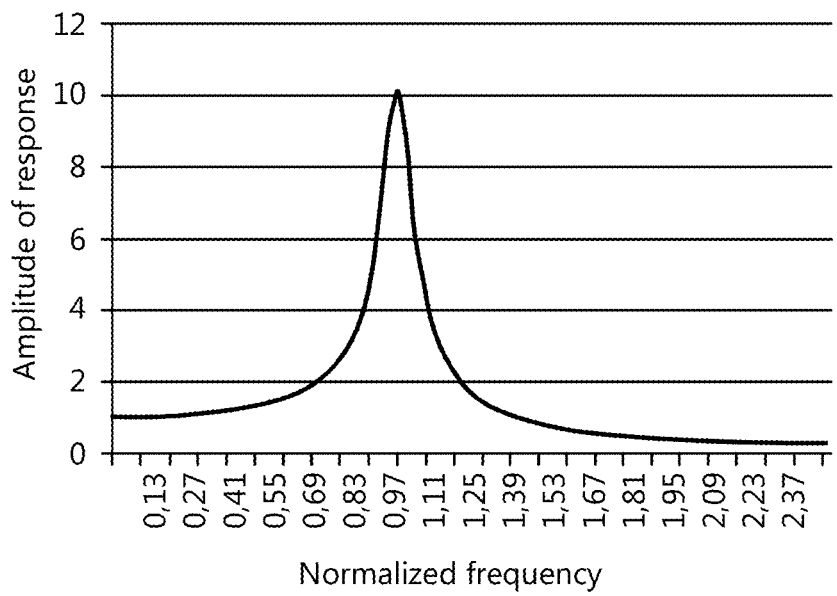
FIG. 3A shows the steady-state variation of the amplitude of longitudinal displacement of the driving rod (denoted as the "Amplitude of response") with respect to the relative driving frequency.

FIG. 4 schematically shows a signal representing a longitudinal displacement of the driving rod over time and a signal representing the (substantially periodic) pulse-wise driving signal.

FIG. 1 schematically shows a cross-sectional view of an embodiment of the device 1 for reciprocally puncturing skin. The device 1 can comprise needle module 4, wherein a movable needle unit 41, comprising one or a plurality needles 45, is arranged. The needle unit 41 is arranged to be reciprocally driven in a first longitudinal direction I, wherein a needle tip 42 is arranged for extending out of the distal end 43 of the needle module housing 44. The maximum displacement of the needle tip 42 in the first longitudinal direction I of a single cycle in the reciprocal motion, is referred to as the extended position. The extended position thereby determines the maximum penetration depth of the needle tip 42 into the skin. Preferably, said extended position is such that a needle penetration depth is 1.5 mm or less, even more preferably 1.2 mm or less, even more preferably 1.0 mm or less. The lower limit is defined such that the ink is introduced sufficiently deep in the skin and may for instance be 0.1 mm, preferably 0.2 mm. A preferred working range is between approximately 0.2 mm and approximately 0.8 mm. Preferably, the needle module 4 further comprises a safety spring 47 that ensures that the needle tip 42 is in the retracted position, i.e. the needle tip 42 is fully enclosed by the needle module housing 44. Hereby, cuts and/or injuries by the needle tip 42, when handling the separated needle modules 4, are prevented.

The needle unit 41 can be arranged to be driven by a distal portion 22 of driving rod 20 of driving device 2. The driving rod 20 is preferably arranged in the center of the driving device 2, such that a substantially axisymmetric construction of the driving device 2 is obtained. In that case, the driving device 2 and/or a housing 10 that serves as a frame member for forming a base construction of the driving device 2 and the driving rod 20 share a common central axis L1. Preferably, the needle unit 41 and needle 45 also share the common central axis L1, such that a simple and efficient transfer of motion between the driving rod 20 and the needle unit 41 can be arranged.

The needle module 4 can be connected to the driving device by means of a spacer 3 for setting a predefined distance between the driving device 2 and the needle module 4. The spacer 3 in fact defines the distance of the needle module housing 44 and the distal end of the driving device 12. The needle unit 41 directly engages with the driving rod 20, such that the spacer 3 does not influence the relative position of the needle unit 41 with respect to the driving device 2. Hence, the spacer 3 thereby directly affects the position of the needle tip 42 with respect to the distal end 43 of the needle module 4 in such a manner that, as seen from the neutral position, a shorter spacer 3 results in that the needle tip 42 will be positioned closer to the distal end 43 of the needle module 4, whereas a longer spacer 3 results in the opposite effect. The distance that the needle tip 42 extends from the needle module housing 44 during use of the device 1, is thereby a function of the amplitude of motion wherein the driving rod 20 is driven and the length of the spacer 3.

Spacer 3 comprises, on its proximal side 34, a driving device connection comprising male and female spacer connector 31, 32, and wherein the spacer 3 comprises one of the male and female spacer connectors 31, 32 on, or near, its distal end 12. The spacer 3 then comprises the other of the male and female spacer connectors 31, 32 on, or near, its proximal end 34, which is on the opposite end of the distal end 35, where a needle module connection, comprising male and female needle module connector 33, 36, and wherein the spacer 3 comprises one of the male and female needle module connectors 33, 36 on, or near, its distal end 12. The needle module 2 then comprises the other of the male and female needle module connectors 33, 36. The needle module connection and/or driving device connections are preferably bayonet connections.

A leaf spring element 15 is arranged at, or near, the distal end 12 of the driving device 2 and serves to assure a precise and reliable connection between the needle module 4 and the spacer 3. Spacer 3 is mountable to the driving device 2 by moving the proximal end 34 of the needle module over the distal end 12 of the driving device 2 in an opposite longitudinal direction II, which is the direction from the distal end 12 to the proximal end 13 of the driving device. Hereby, the leaf spring element 15 is pushed in, resulting in an elastic reaction force in the first longitudinal direction I. From this point, the spacer 3 is rotated clockwise, or counter-clockwise, around the central axis L1, until a set of cooperation protrusions and/or recessions arranged on the male and female connectors 31, 32 engage through a snapping-type of operation. The leaf spring element 15 hereby ensures that the set of cooperation protrusions and/or recessions remains engaged, to prevent accidental decoupling. The spacer 3, for instance after use, is dismountable from the driving device 2 by the performing these steps in an opposite order. The needle module 2 is connectable to the spacer 3 using similar steps.

Furthermore it is noted that the spacer 3 can be an integral part of the driving device 2, or an integral part of the needle module 4. In the former case, the needle unit 4 is directly connectable to the driving device 2 via the connection comprising needle module connectors 33, 36. In the latter case, the needle unit 4 is directly connectable to the driving device 2 via the connection comprising spacer connectors 31, 32.

The driving rod 20 is for the most part enclosed by the housing 10, which surrounds and protects most of the inner parts of the driving device, whereby the distal portion 22 is allowed to extend from the housing 11 in order to engage the needle unit 41. The driving rod 20 can be suspended by suspension system 5 to be substantially only movable in the first longitudinal and opposite longitudinal directions I, II. The driving rod 20 is elastically suspended in the longitudinal directions I, II by means of, for instance, two compression coil-springs 51, 52. The coil-springs 51, 52 can be equal to each other, but can also have properties different from one and the other. These coil-springs are arranged in between the driving rod 20 and housing 10, such that they deform upon a relative displacement of the driving rod 20 with respect to the housing 10 in at least the longitudinal directions I, II. Coil-springs 51, 52 can be arranged between an inner wall 13 extending (radially) inwardly from housing 10 and an abutment shoulder 53 that is formed by an outwardly extending protrusion (in the radial direction) on the driving rod 20. These coil-springs can be arranged in such a manner on, or near, the distal portion 22 and/or proximal end 23 of the driving rod 20. By arranging the coil-springs 51, 52 with a certain predefined pre-loading, the driving rod 20 will be biased towards a neutral position when the device 1 is at rest, wherein the elastic forces of the coil-springs 51, 52 are statically in equilibrium with each other.

The driving device 2 comprises the drive means 14 which is formed by an electromagnetic coil 11, or a plurality of coils, and a magnetic portion 21. The electromagnetic coil 11 can be formed on the inner side of the housing 10 which then encloses most of the inner parts of the driving device 2, as explained above. The magnetic portion 21 that can comprise, for instance, a ferromagnetic element (i.e. an iron section, core or the like), permanent magnet and/or a plurality of these, is comprised in the driving rod 20. The electromagnetic coil 11 at least partially surrounds the magnetic portion 21, such that an magnetic field that is generated by the electromagnetic coil 11 interacts with the magnetic portion 21 to generate a driving forces that forces the driving rod 20 to start moving. A reciprocal motion of the driving rod 20 can, for instance, be obtained by supplying an alternating current to the electromagnetic coil 11, which results in an alternating magnetic field and thereby in successively pushing the driving rod 20 in the first longitudinal direction I of its distal portion 22, or pulling the driving rod 20 in the opposite longitudinal direction II.

Measurement unit 6 can further be comprised in the driving device 2, wherein the measurement unit 6 is arranged to measure a state variable, such as a displacement, velocity and/or acceleration of the driving rod 20 along the longitudinal directions I, II and/or the driving force in the longitudinal directions I, II of the driving mechanism. A measurement coil 61 can be, for instance, arranged on the inner side of the housing 10, wherein the measurement coil 61 is arranged at a distance and/or insulated from the electromagnetic coil 11. On the driving rod 20, at a longitudinal position that corresponds at least partially with the longitudinal position of the measurement coil 61, a secondary magnetic or ferromagnetic section 62 is arranged, which is arranged at a distance and/or insulated from the magnetic portion 21 by, for instance, an insulator 63. The movement of the secondary magnetic or ferromagnetic section 62 through the measurement coil 61 induces inductive currents in the measurement coil 61, which can be measured and used for determining the movement of the driving rod 20 with respect to the housing 10.

Driving device 2 can further comprise a controller 7 that can be arranged for controlling the amplitude of longitudinal displacement by controlling a driving force generated by the driving mechanism and/or by means of controlling the driving frequency. This is for instance done by controlling the current and/or frequency of the alternating (or dynamically controlled) current that the electromagnetic coil 11 uses for driving the driving rod 20. Furthermore, the controller 7 can be arranged to control, based on the measured state variable, such as the displacement of the driving rod 20, that is measured by the measurement unit 6, the amplitude of longitudinal displacement. Hereby a closed loop control system can be obtained that used the directly measured acceleration, velocity or displacement of the driving rod 20 to dynamically control the amplitude and/or frequency of the current that is fed to the electromagnetic coil 11.

FIG. 2 schematically shows the equivalent dynamic model of the suspended driving rod 20 to explain the working principle and technical advantage of the embodiment shown in FIG. 1. The driving rod 20 is hereby characterized as the mass m of the system, whereas the coil-springs 51, 52 are represented by stiffness's $k_1$, $k_2$ and are arranged between the driving rod 20 and housing 10, and dashpots c1, c2 represent in a simplified equivalent manner, the losses due to friction, damping and other energy losses present in the device 1. For simplicity, it is assumed that the mass of the needle unit 41 and stiffness of safety spring 47 are negligible with respect to the mass and stiffness of the suspended driving rod 20. Nonetheless, the working principle also holds if this would not be the case.

The resonance frequency of the suspended driving rod 20 is determined from the dynamic equation of the equivalent system shown in FIG. 2:

$$m\ddot{u}+c\dot{u}+ku=F,$$

wherein k=k1+k2; c=c1+c2; u, $\dot{u}$, $\ddot{u}$ denote the respective longitudinal displacement, velocity and acceleration of the driving rod 20; F denotes the applied (driving) force. The respective (undamped) resonance frequency $\omega_0$ and damping ratio of such a system is easily determined to be:

$$\omega_0 = \sqrt{\frac{k}{m}}; \zeta = \frac{c}{2\sqrt{mk}}$$

Assuming a relatively low damping, which results in low energy losses and is hence beneficial for the efficiency of the device, the steady-state dynamic amplification factor A of the system is determined to be:

$$A = \frac{1}{m\sqrt{(2\omega_0\omega\zeta)^2 + (\omega_0^2 - \omega^2)^2}},$$

wherein $\omega$ denotes the driving frequency of the system. By normalizing the mass of the system and by normalizing the driving frequency with respect to the resonance frequency, the dynamic amplification factor is shown in FIG. 3A. Here it is noted that, by driving the suspended driving rod 20 with a driving frequency that is equal to, and/or around, the resonance frequency, a large amplitude of displacement (amplitude of response) is obtained.

Figure 3B:
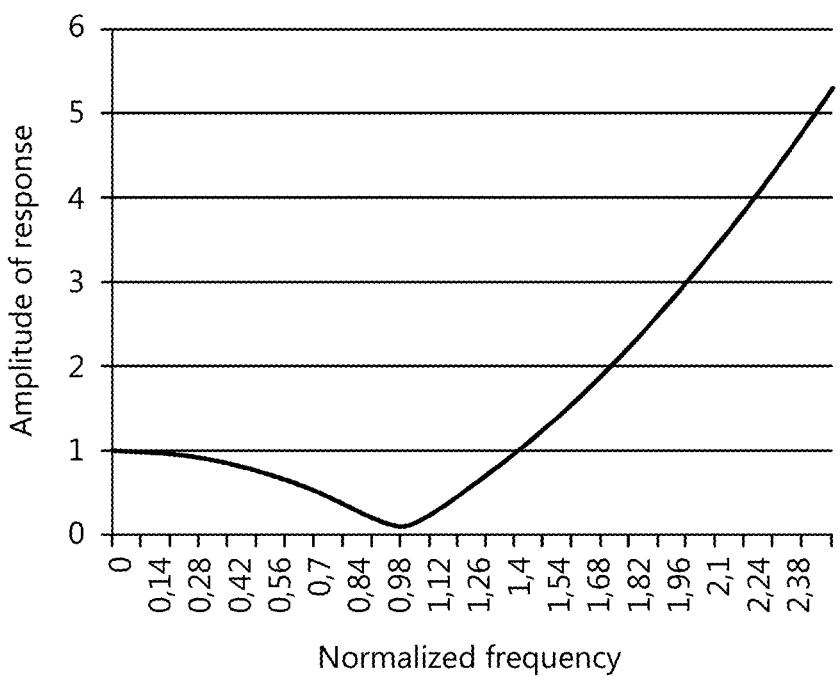
FIG. 3B shows the steady-state variation of the normalized force per unit of longitudinal displacement of the driving rod (denoted as the "Amplitude of response") with respect to the relative driving frequency.

By inverting this relation, a normalized force per unit displacement relationship is obtained. Or, in other words, the relationship between a required force to obtain a certain displacement as a function of the normalized frequency. This relation is shown in FIG. 3B, where it is seen that at the resonance frequency a minimum force is required for driving the suspended driving rod 20 at a unit displacement. Hereby a device 1 for reciprocally puncturing skin is obtained that can be very efficiently driven around the Eigenfrequency of the suspended driving rod 20. In addition, the longitudinal displacement of the driving rod 20, and thereby the needle tip 42, can be controlled by controlling the driving frequency of the driving mechanism based on, or as a function of, the resonance frequency. The relation shown in FIG. 3B also enable feedforward control by the controller 7, as the a priori knowledge on the relation between longitudinal displacement of the driving rod 20 and the driving force generated electromagnetic coil 11 and/or the driving frequency can be available to the controller 7.

FIG. 4 schematically shows a normalized signal 101 representing a longitudinal displacement along first longitudinal direction I of the driving rod 20 over time (t) and a normalized signal 102 representing the (substantially periodic) pulse-wise driving signal. In the first part of the signal over time (i.e. before t2), the driving rod 20 shows a reciprocal motion having a first resonance frequency f1 corresponding to a first resonance period tp1. In the second part of the signal over time (i.e. after t2), the driving rod 20 shows a reciprocal motion having a second resonance frequency f2 corresponding to a second resonance period tp2. It is seen that second resonance period tp2 is greater than first resonance period tp1, such that the second resonance frequency f2 is lower than the a first resonance frequency f1. This could for instance occur due to mounting the needle module 4 to the driving device 2, such that a mass of the needle unit 41 is added to the moving part of the system.

In this example it is seen that the (substantially periodic) pulse-wise driving signal has adapted to the change in resonance frequency of the driving rod 20. As explained above, the measurement unit 6 can measure a state variable upon which the controller 7 can determine the displacement zero-crossing 105, 106 and vary the time between successive pulses 103, 104, such that optimal energy efficiency for the driving is obtained. Furthermore, the (substantially periodic) pulse-wise driving signal shows two different pulses 103, 104 having respective different pulse widths dt1, dt2. By increasing the width dt2 of pulse 104 with respect to width dt1 of pulse 103, more energy is transferred to the moving driving rod 20 by means of driving mechanism 14, such that one can accurately control the displacement of the driving rod 20 in the longitudinal direction I.

Note that the present invention is not limited to the embodiment shown, but extends also to other embodiments falling within the scope of the appended claims.

The invention claimed is:

1. A device for puncturing skin in a reciprocal manner for applying a non-permanent skin mark comprising a reciprocally movable needle, wherein the reciprocally movable needle is comprised in a needle unit that is arranged in a needle module, wherein the needle unit is arranged to be movable in a longitudinal direction with respect to the needle module, wherein the needle module comprises a needle module housing, and a driving device that comprises:

a driving mechanism and a driving rod that is arranged for driving the reciprocally movable needle between a retracted position wherein it is enclosed by the needle module housing and an extended position wherein it is enclosed by the needle module housing, wherein said extended position is such that a needle penetration depth is 1.5 mm or less;

wherein the driving mechanism is arranged for reciprocally driving the driving rod in a longitudinal direction along the longitudinal axis of the driving rod;

wherein the driving device further comprises a suspension system arranged in between a frame member of the driving device and the driving rod and, wherein the suspension system is arranged for elastically suspending the driving rod in the longitudinal direction in the frame member, such that the driving rod is movable in a longitudinal direction and wherein the suspension system is further arranged for biasing the driving rod to a longitudinal neutral position;

wherein the suspension system is arranged such that the driving rod has a predefined resonance frequency in the longitudinal direction and wherein the driving mechanism is arranged for reciprocally driving the driving rod in a driving frequency, wherein the driving frequency is based on the resonance frequency, wherein the driving mechanism comprises an electromagnetic coil and a magnetic portion, wherein the driving device further comprises a controller which is arranged for controlling the amplitude of longitudinal displacement of the driving rod by providing the driving mechanism with a pulse-wise driving signal, wherein the driving device further comprises a measurement unit, wherein the measurement unit is arranged to measure a displacement of the driving rod along the longitudinal direction of the driving mechanism, wherein the measurement unit comprises a secondary magnetic portion and a measurement coil, wherein the magnetic portion of the driving mechanism and the secondary magnetic portion of the measurement unit are arranged on one of the driving rod and the frame member, and wherein the electromagnetic coil of the driving mechanism and the measurement coil are arranged on the other of the frame member and the driving rod, wherein the secondary magnetic portion is arranged at a distance from and isolated from the magnetic portion of the driving mechanism, and wherein the measurement coil is arranged at a distance from and isolated from the electromagnetic coil of the driving mechanism, wherein the measurement coil is arranged at a longitudinal position that at least partially overlaps with a longitudinal position of the secondary magnetic portion, and wherein the controller is arranged to control, based on the measured displacement, the amplitude of longitudinal displacement by varying a pulse width of respective pulses of the pulse-wise driving signal.

2. The device according to claim 1, wherein the driving frequency is in a range of 70% to 130% of the resonance frequency.

3. The device according to claim 2, wherein the predefined resonance frequency $\omega_0$ is determined according to:

$$\omega_0 = \sqrt{\frac{k}{m}}$$

and wherein a mass m of the driving rod and a stiffness k of the suspension system is chosen such that the predefined resonance frequency of the suspended driving rod is in the range of 30 Hz-250 Hz.

4. The device according to claim 1, wherein the suspension system comprises two elastic elements that are arranged in between the driving rod and the frame member, and, wherein a first elastic element of the two elastic elements is arranged for biasing the driving rod in a first longitudinal direction with respect to the frame member and wherein a second elastic element of the two elastic elements is arranged for biasing the driving rod in a second longitudinal direction with respect to the frame member, and wherein the second longitudinal direction is opposite to the first longitudinal direction.

5. The device according to claim 4, wherein each of said first and second elastic elements is arranged to contact the frame member on a first end thereof and the driving rod on a second end thereof, such that, when in rest, the driving rod is biased to the neutral position, wherein the neutral position is located on, or in between, the retracted and extended positions.

6. The device according to claim 1, wherein one of the electromagnetic coil and the magnetic portion, at least partially, surround the other of the electromagnetic coil and the magnetic portion.

7. The device according to claim 6, wherein the electromagnetic coil comprises a plurality of electromagnetic coils, wherein the controller is arranged for controlling and/or switching at least two of the plurality of electromagnetic coils with a different current and/or voltage for generating a respective plurality of magnetic fields.

8. The device according to claim 7, wherein the plurality of electromagnetic coils are arranged on one of the frame member and the driving rod and are arranged parallel along the longitudinal axis of the driving rod, and wherein at least a part of the magnetic portion extends along the longitudinal axis between two of the plurality of electromagnetic coils in the extended and retracted position.

9. The device according to claim 1, wherein the driving device is arranged to mount the needle module by means of a releasable force- and/or form-locked connection.

10. The device according to claim 9, wherein the releasable force- and/or form-locked connection is a bayonet connection comprising a male and a female connector, and wherein the driving device comprises one of the male and female connectors.

11. The device according to claim 10, wherein the needle unit is arranged to be movable in the longitudinal direction with respect to the needle module.

12. The device according to claim 11, further comprising a spacer element that is arranged in between the needle module and the driving device for arranging the needle module at a predefined distance from the driving device.

13. The device according to claim 12, wherein the driving device is arranged for releasable mounting of the needle module and/or the spacer element and comprises a first section of the releasable force- and/or form-locked connection, and wherein the first section of the releasable force- and/or form-locked connection is arranged for engaging and connecting to a second section of the releasable force- and/or form-locked connection that is arranged on the spacer element and/or the needle module.

14. The device according to claim 13, wherein the needle module and/or the spacer element comprises the other of the male and female connectors for forming the bayonet connection.

* * * * *